United States Patent
Lee et al.

(10) Patent No.: US 12,521,338 B2
(45) Date of Patent: Jan. 13, 2026

(54) TOOTH BRIGHTENING COMPOSITION, KIT, AND METHOD OF USING THE SAME

(71) Applicant: TOOTHFILM INC., Taipei (TW)

(72) Inventors: Chung-Lin Lee, Taipei (TW); Zhi-Yun Lin, Taipei (TW); Rui-Feng Yen, Taipei (TW); Jian-Hong Lai, Taipei (TW); Kuan-Te Su, Taipei (TW)

(73) Assignee: TOOTHFILM INC., Taipei (TW)

( * ) Notice: Subject to any disclaimer, the term of this patent is extended or adjusted under 35 U.S.C. 154(b) by 350 days.

(21) Appl. No.: 18/318,459

(22) Filed: May 16, 2023

(65) Prior Publication Data

US 2023/0404899 A1    Dec. 21, 2023

(30) Foreign Application Priority Data

Jun. 15, 2022    (TW) .................................. 111122288

(51) Int. Cl.
*A61K 8/87*    (2006.01)
*A61Q 11/00*    (2006.01)

(52) U.S. Cl.
CPC ................ *A61K 8/87* (2013.01); *A61Q 11/00* (2013.01); *A61K 2800/92* (2013.01)

(58) Field of Classification Search
CPC ..................................................... A61Q 11/00
USPC .................................... 424/49, 401; 433/215
See application file for complete search history.

(56) References Cited

U.S. PATENT DOCUMENTS

| 8,680,036 B2 | 3/2014 | Gonzales et al. |
| 2008/0112909 A1 | 5/2008 | Faler et al. |
| 2013/0004556 A1 | 1/2013 | Hofacker et al. |

FOREIGN PATENT DOCUMENTS

| CN | 1764433 B | 4/2010 |
| CN | 107041124 A | 8/2017 |
| CN | 110200861 A | 9/2019 |

OTHER PUBLICATIONS

SuBang Fluorescence Technology, "What's the differences between whitening with fluorescent whitening agents, chemical bleaching, and whitening with blueing agent?" https://zhuanlan.zhihu.com/p/101278111; Jan. 6, 2020, 2 pages.

*Primary Examiner* — Walter E Webb
(74) *Attorney, Agent, or Firm* — MUNCY, GEISSLER, OLDS & LOWE, P.C.

(57) ABSTRACT

The present disclosure relates to a tooth brightening composition comprising polyurethane, at least one white food colours and at least one blue food colours and optionally other orally acceptable carriers and/or excipients. The present disclosure also provides a tooth brightening kit and a tooth brightening method with the tooth brightening composition.

20 Claims, 8 Drawing Sheets

TOOTH BRIGHTENING COMPOSITION, KIT, AND METHOD OF USING THE SAME

CROSS REFERENCE TO RELATED APPLICATIONS

The non-provisional patent application claims priority to Taiwan patent application with serial number TW 111122288 filed on Jun. 15, 2022. This and all other extrinsic materials discussed herein are incorporated by reference in their entirety.

BACKGROUND

Technology Field

The disclosure relates to a tooth brightening composition, a kit, and a method of using the tooth brightening composition.

Description of Related Art

Recently, more and more people pay attention to the beauty of their teeth. White and bright teeth are what everyone wants to have. Teeth whitening methods can be divided into chemical whitening and physical whitening.

Chemical tooth bleaching is the most effective way to remove pigment deposited on teeth, and its effect depends on the concentration of peroxide and how long the peroxide is in contact with the teeth, wherein the effect of chemical bleaching using peroxide is better, and it is most commonly used by consumers. Although the chemical bleaching has a good effect, there are many research findings in academic journals report that there will be many side effects after teeth bleaching. For example, after the bleaching process, it is easy to cause damage to the tooth surface, swelling and discomfort of the gums, sensitive teeth, oral blisters and pigment being easier to deposit on the tooth surface, and many other side effects.

Physical whitening mainly focuses on the change of the color and brightness of the tooth surface. Common physical whitening methods are color complementing or sandblasting-polishing on the tooth surface. The main principle of color-complement is to use the complementary color of light to make the pigment with contrasting color adhere to the teeth, resulting in the color mixing of light, so that the teeth have a temporary whitening effect. Tooth polishing is to use a polishing paste containing a large amount of abrasives and use instruments to perform low-speed rotary polishing on the tooth surface, which can remove scratches and surface pigment deposited on the teeth, making the surface of the teeth very smooth and shiny. Although the physical whitening method has a mild effect and fewer side effects, the whitening effect is limited, and its satisfaction is not high compared with chemical whitening.

In addition, due to the busy life and work, it is often time-consuming and inconvenient to go to the dentist for teeth cleaning or teeth whitening treatment. Therefore, for general consumers, there is a need for a tooth brightening composition that can brighten and whiten teeth quickly for a sustained period of time and is convenient to use.

Polyurethane colloid is a polymer compound, including polyester type and polyether type. Polyurethane compound is often used as an elastomer or a film-forming agent. In addition to the film-forming effect on the skin surface, polyurethane colloid also has an excellent film-forming effect on the tooth ceramic surface, and is a raw material that can improve adhesion.

In order to solve the above-mentioned shortcomings of physical whitening and meet the needs of consumers, on the premise that users can use it frequently and reduce side effects, the inventors of the present application have significantly improved and enhanced the tooth brightening and whitening effect by using polyurethane colloid as a film-forming agent to enhance the adhesion ability of color-supplementing raw materials on teeth and enhance the physical tooth-color complementing technology.

SUMMARY

The disclosure provides a tooth brightening composition comprising polyurethane, at least one white food colour and at least one blue food colour, and optionally other orally acceptable carriers and/or excipients.

The disclosure also provides a tooth brightening kit comprising a tooth brightening composition and instructions for using the tooth brightening composition.

The disclosure also provides a method for brightening teeth comprising applying a tooth brightening composition to teeth, wherein the composition comprises polyurethane, at least one white food colours and at least one blue food colours, and optionally other orally acceptable carriers and/or excipients.

BRIEF DESCRIPTION OF THE DRAWINGS

The following detailed description of illustrative embodiments of the invention will be better understood when read in conjunction with the appended drawings. For the purpose of illustrating the invention, certain illustrative embodiments are shown in the drawings. It should be understood, however, that the invention is not limited to the precise arrangements and instrumentalities of the embodiments shown in the drawings.

DETAILED DESCRIPTION OF THE DISCLOSURE

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details.

Definitions

As used herein, each of the following terms has the meaning associated with it in this section.

Unless defined otherwise, all technical and scientific terms used herein generally have the same meaning as commonly understood by one of ordinary skill in the art to which this disclosure belongs. Generally, the nomenclature used herein and the laboratory procedures in animal pharmacology, pharmaceutical science, separation science, and organic chemistry are those well-known and commonly employed in the art. It should be understood that the order of steps or order for performing certain actions is immaterial, so long as the present teachings remain operable. Furthermore, two or more steps or actions may or may not be performed simultaneously.

As used herein, the articles "a" and "an" refer to one or to more than one (i.e., to at least one) of the grammatical object of the article. By way of example, "an element" means one element or more than one element.

All percentages used herein are by weight of the tooth brightening composition, unless otherwise specified. The percentage or ratio used herein are percent by weight or weight ratio of the respective component, unless otherwise specified. All measurements are performed at 25° C., unless otherwise specified.

As used herein, the term "tooth" or "teeth" refers to a natural tooth or an artificial dentition. As used herein, "tooth surface" refers to a surface of a natural tooth or a hard surface of artificial dentition including a denture, dental cap, crown, plate, bridge, filling, dental implant and the like. In one embodiment, the tooth surface refers to a surface of a natural tooth.

As used herein, the term "composition" refers to a mixture of at least one compound useful in the present disclosure and orally acceptable carriers and/or excipients.

As used herein, the term "orally acceptable" refers to a material, such as a carrier or diluent, which does not abrogate the biological activity or properties of the compound useful within the invention, and is relatively non-toxic, i.e., the material may be administered to a subject without causing undesirable biological effects or interacting in a deleterious manner with any of the components of the composition in which it is contained.

As used herein, the term "effective amount" means an amount of a compound or composition sufficient to significantly induce a positive benefit, preferably an oral health benefit, but low enough to avoid serious side effects, i.e., to provide a reasonable benefit to risk ratio, within the sound judgment of a skilled artisan.

Ranges: throughout this disclosure, various aspects of the invention can be presented in a range format. It should be understood that the description in a range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual and partial numbers within that range, for example, 1, 2, 2.7, 3, 4, 5.3, and 6. This applies regardless of the breadth of the range.

Tooth Brightening Composition

As used herein, a "tooth brightening composition" refers to a composition for which the intended use can include oral care, oral hygiene, or oral appearance. The tooth brightening composition of the present disclosure comprises polyurethane, at least one white food colour and at least one blue food colour and optionally other orally acceptable carriers and/or excipients. The above food colours are safe to use within legal concentrations and are commonly used in food processing, and other hygiene and cosmetic applications.

The tooth brightening composition of the present disclosure may comprise orally acceptable amount of polyurethane. In one embodiment, the tooth brightening composition of the present disclosure may comprise polyurethane in an amount of from about 30% to about 3% by the total weight of the composition, and preferably, from about 30% to about 10%, and more preferably, from about 30% to about 20%. In another embodiment, the amount of polyurethane in the tooth brightening composition of the present disclosure may be 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4% or 3% by the total weight of the composition, or any content between the above-mentioned contents.

The tooth brightening composition of the present disclosure may comprise orally acceptable amount of white food colours, which can increase the opacity of the composition or preparation. In one embodiment, the tooth brightening composition of the present disclosure may comprise the white food colours in an amount of from about 10% to about 0.1% by the total weight of the composition, and preferably, from about 5% to about 0.25%, and more preferably, from about 4% to about 2%, and the mast preferably, from about 4% of the white food colour. In another embodiment, the content of the white food colour in the tooth brightening composition of the present disclosure can be 10%, 9%, 8%, 7%, 6%, 5%, 4%, 3%, 2.8%, 2.6%, 2.4%, 2.2%, 2.0%, 1.8%, 1.6%, 1.4%, 1.2%, 1.0%, 0.9%, 0.8%, 0.7%, 0.6%, 0.5%, 0.4%, 0.3%, 0.2% or 0.1% by the total weight of the composition, or any content between the above-mentioned contents.

In one embodiment, the food colours included in the tooth brightening composition of the present disclosure may be a white food colour as disclosed in the Colour Index International (CI) of the standardized color classification system. The white colours may include CI 75170, CI 77002, CI 77004, CI 77019, CI 77120, CI 77163, CI 77220, CI 77231, CI 77713, CI 77891, or the combination thereof, and preferably, is CI 77891, CI 77019, CI 77220, CI77004 or the combination thereof, and more preferably, is CI 77891.

In one embodiment, the blue food colours included in the tooth brightening composition of the present disclosure may be a greenish-blue or bright blue food colour or other blue-based pigments disclosed in the Colour Index International (CI) of the standardized color classification system. The blue colours may include CI 42051, CI 42090, CI 69800, CI 69825, CI 73000, CI 73015, CI 74160, CI 77007, CI 77346, CI 77510, CI 20470, CI 42080, CI 61585, CI 62045, CI 74100, CI 74180, or the combination thereof, and preferably, is CI 42090, CI73015, CI77007, or the combination thereof, and more preferably is CI 42090. In one embodiment, the blue food colour is a water-soluble transparent blue food colour.

CI 42090 is also known as FD&C Blue #1 or brilliant blue FCF, and is an organic compound belonging to triarylmethane dyes, the chemical name is N-ethyl-N-[4-[[4-ethyl[(3-sulfophenyl)methyl]amino]phenyl](2-sulfophenyl)methylene-2,5-cyclohexadien-1-ylidene]-3-sulfo-, innersalt, aluminumsalt. The chemical formula is as follows:

AlH$_3$

In one embodiment, the tooth brightening composition of the present disclosure may comprise the blue food colours in an amount of from about 5% to about by the total weight of the composition, and preferably, from about 3% to about and more preferably, from about 0.5% to about 0.06%, and the mast preferably, from about 0.3% of the blue food colours. In another embodiment, the content of the blue food colour in the tooth brightening composition of the present disclosure can be 1.0%, 0.9%, 0.8%, 0.7%, 0.6%, 0.5%, 0.4%, 0.3%, 0.2%, 0.1%, 0.09%, 0.08%, 0.07%, 0.05%, 0.04%, 0.03%, 0.02%, 0.01% by the total weight of the composition, or any content between the above-mentioned contents.

The tooth brightening composition of the present disclosure may further comprise the orally acceptable amount of the other food colours as the materials of complementary color enhancers. The content of the food colour can be varied according to the range of the respective oral acceptable amount and the range of the effective amount for tooth brightening. Food colours of other colors may include food colours such as CI 45430 and the like. Food colours contented in the tooth brightening composition of the present disclosure can also be other types of food colours, such as Bromothymol blue and the like.

The tooth brightening composition of the present disclosure may further comprise the orally acceptable amount of the other colours including, such as, pigments, pigments, dyes and agents, providing a particular luster or reflectivity. In one embodiment, the colour can adhere to tooth surfaces to provide white or light-colored coatings and to enhance brightness. Other orally acceptable colours may include FD&C dyes and pigments, talc, magnesium carbonate, calcium carbonate, magnesium silicate, silica, zinc oxide, ferric ammonium ferrocyanide, ultramarine, titanated mica, bismuth oxychloride, and mixtures thereof. One or more colours are optionally present in a total amount from about 0.001% to about 20%, such as from 0.01% to 10% or from 0.1% to 5%.

Additives, Carriers and Excipients

The "orally acceptable additives", "orally acceptable carriers" and/or "orally acceptable excipients" are used interchangeably herein, and refer to any additives, carriers and/or excipients useful for the tooth brightening composition of the present disclosure. The orally acceptable additives, carriers and/or excipients are not harmful to a mammal when retained in the mouth in amounts disclosed herein without swallowing for a period sufficient to permit effective contact with a tooth surface as required herein. Generally, the orally acceptable carriers and/or excipients are not harmful even if unintentionally swallowed.

As used herein, the orally acceptable carriers and/or excipients mean any safe and effective materials that may be used in the tooth brightening composition in the embodiment or examples disclosed herein and do not alter the efficacy or properties of the main ingredients described above. The suitable orally acceptable carriers and/or excipients useful in the tooth brightening composition of the present disclosure may contain one or more materials selected from the group consisting of water, humectant, anti-calculus agent, surfactant, anti-sensitizer, pH adjuster, anti-bacterial, preservative, sweetener, flavoring agent and the like.

The tooth brightening composition of the present disclosure may comprise at least one humectant selected from the group consisting of sorbitol, glycerol, xylitol, propylene glycol, 1,2-hexanediol, and the combination thereof, wherein glycerol and 1,2-hexanediol is preferable. The content of the humectant may be from about 0.1 to about 30%, such as from about 0.1% to about 30% of glycerol and/or from about 0.1% to about 10% of 1,2-hexanediol.

The tooth brightening composition of the present disclosure may comprise polyphosphate materials as anticalculus agents which are known to be effective in reducing calcium phosphate mineral deposition related to calculus formation, such as pyrophosphates, and tripolyphosphates, or synthetic anionic polymers, such as polyacrylates and copolymers of maleic anhydride or acid and methyl vinyl ether, and the combination of the above materials, wherein acrylates copolymer is preferable. The content of the anticalculus agent may be from about 0.1% to about 20%. The tooth brightening composition of the present disclosure may comprise at least one surfactant, which may be may be anionic, nonionic, amphoteric, zwitterionic, cationic, or mixtures thereof. The surfactant is preferably selected from the group consisting of polysorbate 20, polysorbate 40, polysorbate 60, polysorbate 65, polysorbate 80, and the combination thereof.

The tooth brightening composition of the present disclosure may comprise at least one sweetening agent selected from the group consisting of isomaltitol, sorbitol, maltose, xylitol, saccharin, sucralose, *stevia* extract, aspartame, and the combination thereof, wherein isomaltitol and sorbitol are preferable. The content of the sweetening agent may be about 0.1% to about 20%.

The tooth brightening composition of the present disclosure may comprise at least one a desensitizing agent, such as potassium salts selected from the group consisting of potassium citrate, potassium nitrate, potassium chloride, and the combination thereof.

The tooth brightening composition of the present disclosure may comprise at least one antibacterial or preservative selected from the group consisting of phenoxyethanol, benzoic acid, salicylic acid, p-hydroxybenzoic acid, methyl-p-hydroxybenzoate, Chlorphenesin, ethylhexylglycerin, and the combination thereof, wherein phenoxyethanol, Chlorphenesin and ethylhexylglycerin are preferable. The content of antibacterial or preservative may be about 0.01% to about 1%, such as from about 0.1% to about 1% of phenoxyethanol, from about 0.01% to about 0.3% of Chlorphenesin, and/or from about 0.1% to about 1% of ethylhexylglycerin.

The tooth brightening composition of the present disclosure may comprise at least one flavoring agent, wherein the flavoring agent comprises essential oils and various flavoring aldehydes, esters, alcohols, wherein examples of the essential oils include oil extracts from lemon, lime, grapefruit, orange, peppermint, wintergreen, *sassafras*, clove, sage, spearmint, marjoram, and/or cinnamon. In one embodiment, the flavoring agent comprises acesulfame potassium, ethyl menthane carboxamide, menthol, carvone or anethole, and acesulfame potassium is preferred. The amount of the flavoring agent may be about 0.1% to about 5% by the total weight of the composition.

The tooth brightening composition of the present disclosure may comprise at least one pH regulator selected from the group consisting of sodium hydroxide, potassium hydroxide, triethanolamine, nitrotriethanol, citric acid, malic acid, lactic acid, sodium citrate, boric acid, borax, potassium hydrogen phosphate, and the combination thereof, wherein potassium hydroxide is preferable. The content of the pH regulator may be from about 0.1% to about 5%.

It will be obvious to one of skill in the art that some components contained in the tooth brightening composition of the present disclosure may perform multiple functions. Therefore, the identification of a compound as having one function herein is not meant to exclude its use for other functions in a particular composition. For example, a compound such as menthol can act both as a flavorant and an antiseptic agent; and polysorbate 20 can act as both a surfactant and as an emulsifier.

Dosage Form

The tooth brightening composition of the present disclosure remains in the oral cavity for a period of time sufficient to contact substantially the tooth surface to achieve brightening activity. Therefore, the tooth brightening composition of the present disclosure may be in the form of a solution, slurry, gel, paste or ointment, or any other dosage form. In one embodiment, the dosage form of the tooth brightening composition is a mouthwash. In another embodiment, the dosage form of the tooth brightening composition is an applying gel. In other embodiment, the dosage form of the tooth brightening composition is a spray.

Use and Method

When applying the tooth brightening composition of the present disclosure, the user only needs to apply the tooth brightening composition to the surface of a human tooth in order to achieve the desired effects in the desired area of the tooth, such as brightening, fresh breath and the like. The tooth brightening composition of the present disclosure may be safely applied to oral surfaces other than teeth, such as oral mucosal tissue or gums, without resulting in or causing irritation or discomfort.

In one embodiment, when the tooth brightening composition of the present disclosure is a dosage form of gel, paste or ointment, an effective amount of the tooth brightening composition may be applied to the tooth surface by a toothbrush, and the tooth surface can be contacted with the tooth brightening composition for a period of time, and then the tooth surface is rinsed and cleaned by gargling. In another embodiment, when the tooth brightening composition of the present disclosure is a dosage form of gel, paste or ointment, an effective amount of the tooth brightening composition may be filled in a braces and worn into teeth, and the tooth surface can be contacted with the tooth brightening composition for a period of time, and then the tooth surface is rinsed and cleaned by gargling. In a preferred embodiment, the tooth brightening composition of the present disclosure is in a dosage form of mouthwash or spray, which can be applied to the tooth surface by spraying directly or by rinsing the mouth for a period of time, and then rinsing the mouth with water to clean the tooth surface.

Depending on the concentration of the active ingredient in the tooth brightening composition, the contact time of the tooth brightening composition with the tooth surface may vary, for example, within 3 minutes, preferably, from 20 seconds to 2 minutes, more preferably, from 20 seconds to 1 minutes, such as 30 seconds.

There are no limitations on the timing and frequency of application of the tooth brightening composition of the present disclosure. Since the tooth brightening composition of the present disclosure can brighten teeth conveniently and quickly for a period of time, users can apply it according to the desired time point and duration of tooth brightening.

Kits

The present disclosure provides a tooth brightening kit comprising the above tooth brightening composition and instructions. Users can refer to the usage method and steps described in the instructions to apply the kit.

The following examples further illustrate the preferred embodiment of the present disclosure. However, it should be understood that the present disclosure is not limited to the contents of the examples described below.

EXAMPLES

Materials and Methods

A. Preparation of Brightening Spray

Each ingredient was weighed according to the contents described in Table 1 for later use. Firstly, glycerol and Chlorphenesin were heated and dissolved until clear, and then water was added. Acrylates copolymer and potassium hydroxide were added into the mixture and stirred until clear and transparent. Polyurethane-35, acesulfame potassium, sorbitol and isomaltitol were added into the mixture and stirred until homogeneous. Ethylhexylglycerin, 1,2-hexanediol, phenoxyethanol and flavoring agent were then added into the mixture and stirred until homogeneous. Finally, food colours CI 77891, CI 42490 1% and CI 45430 1% were added into the mixture and stirred well and the preparation is complete.

According to the above procedures, the brightening agent formulations A~C in spray form containing different concentrations of polyurethane-35, CI 77891 and CI 42090 1% were prepared. A control formulation did not contain polyurethane, CI 77891 and CI 42090 1%, and the three components were replaced with the same content of water. The detailed ingredients of formulas A~C and the control group are shown in Table 1, except for polyurethane, CI 77891 and CI 42090 1%, the other ingredients and contents are the same.

TABLE 1

The components of brightening spray

| | Proportion (%) | | | |
|---|---|---|---|---|
| Components | Control | Formulation A (%) | Formulation B (%) | Formulation C (%) |
| Polyurethane-35 | 0 | 15 | 24 | 27 |
| CI 77891 | 0 | 2 | 3.5 | 4 |
| CI42090 1% | 0 | 0.06 | 0.2 | 0.3 |
| Other components: Water, acrylates copolymer, acesulfame potassium, sorbitol, isomaltitol, potassium hydroxide, phenoxyethanol, ethylhexylglycerin, flavoringagent, CI 45430 1%, glycerol, Chlorphenesin, 1,2-hexanediol | adding to 100% | adding to 100% | adding to 100% | adding to 100% |

B. Methods of Group Testing

In the group testing, firstly, a small group testing survey (N=16) was carried out for the four formulations. A 3-hour brightening and long-acting verification of the formulation with the best effect (N=6). After the test, choose A and C to carry out a large group testing survey (N=100-102).

C. Subject Screening

Subjects participating in the group testing were screened according to the following criteria:
1. 20~55 years old;
2. Profession: Full-time, part-time office worker, student or housewife;
3. Educational background High school or above;
4. Gender unlimited;
5. Persons who have ever used tooth whitening products or had teeth whitening in clinics, but those who have used clinic whitening/dental strips/denture base combination/gel/essence within half a year are excluded.
6. Willingness to purchase tooth whitening related products, such as toothpaste, mouthwash, gel, spray, etc. in the next year.

The subjects who meet all the above-mentioned conditions 1-6 were selected and registered, and included in the group testing to carry out the follow-up subjective and objective investigation of the effect of the brightening spray of the present disclosure.

D. Preparation of Chart of Shade Guide

Figure 1:
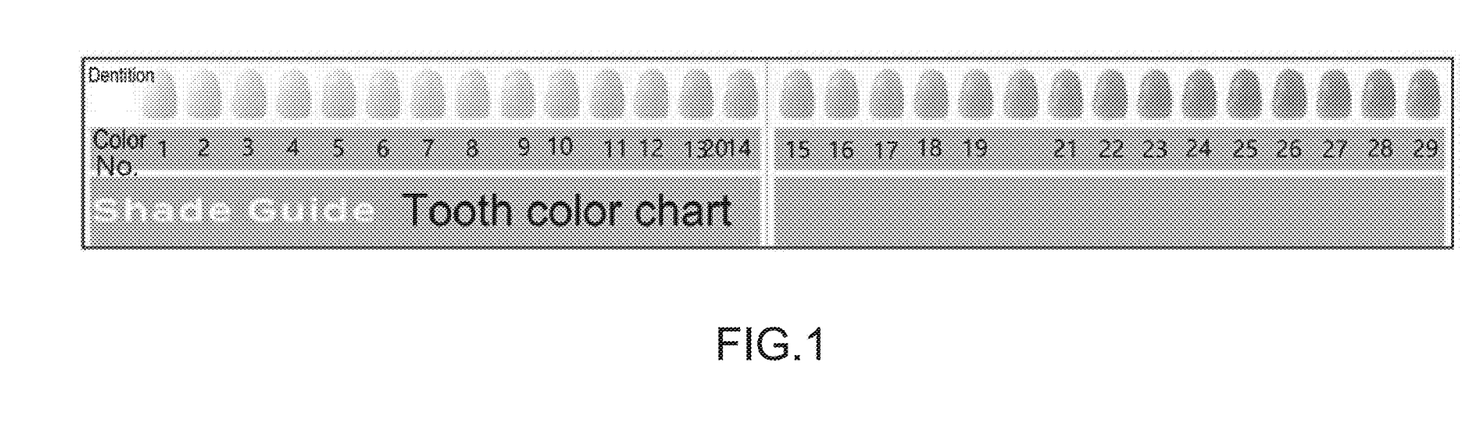
FIG. 1 is a tooth color chart of shade guide made by using a camera (Canon M6 Mark ii) with reference to the whitening shade guide (VITA Bleachedguide 3D-MASTER).

According to the 29-color whitening scale issued by the American Dental Association (ADA) as the colorimetric benchmark, using the whitening shade guide (VITA Bleachedguide 3D-MASTER) as the reference standard, a tooth color chart was made with a camera (Canon M6 Mark ii), as shown in FIG. 1, for comparing the results of tooth shade changes.

Example 1-Small Group Testing Survey 1.1 Evaluating the Tooth Color Scale Before Using the Brightening Spray Each subject brushed teeth before the test, and then irradiated the tooth surface with a hand-held white LED light in front of the mirror, compared with the VITA tooth color chart, and recorded the self-evaluation color scale. Then the tooth color scale photos were taken, and the subjects and two evaluators jointly judged the tooth color scale.

1.2 Brightening Spray Test

The brightening sprays of the above control group and Formulation A~C groups were sprayed on the surface of the teeth of the subjects, and rinsed after staying for 1 minute.

1.3 Evaluating Tooth Color Scale after Using the Brightening Spray

Each subject irradiated the tooth surface with a hand-held white LED light in front of the mirror, compared with the VITA tooth color chart, and recorded the self-evaluation color scale. Then the tooth color scale photos were taken, and the subjects and other two evaluators jointly judged the tooth color scale.

1.4 Filling in the Post-Test Questionnaire

The subjects filled in the test evaluation of the tooth brightening spray according to the contents of the questionnaire. The content of the closed questionnaire included surveys on the relevant living habits of the subjects, the condition of the teeth before use, and the degree of feeling and satisfaction with the brightening and whitening of different formulations after use, wherein the satisfaction includes the satisfaction of brightening and whitening effect and overall satisfaction (including the degree of feeling of brightening and whitening effect and overall use experience), both of which are evaluated from 1 point (dissatisfied) to 10 points (satisfied).

1.5 Statistics

The correlation of the results of the test was analyzed with the statistic t-test calculated based on the mean of group to understand whether there is a significant difference in the key raw materials for tooth brightening and whitening, and the difference in the experience of different formulations for hundreds of persons, to verify the experiment accuracy.

1.6 Results

Figure 2:
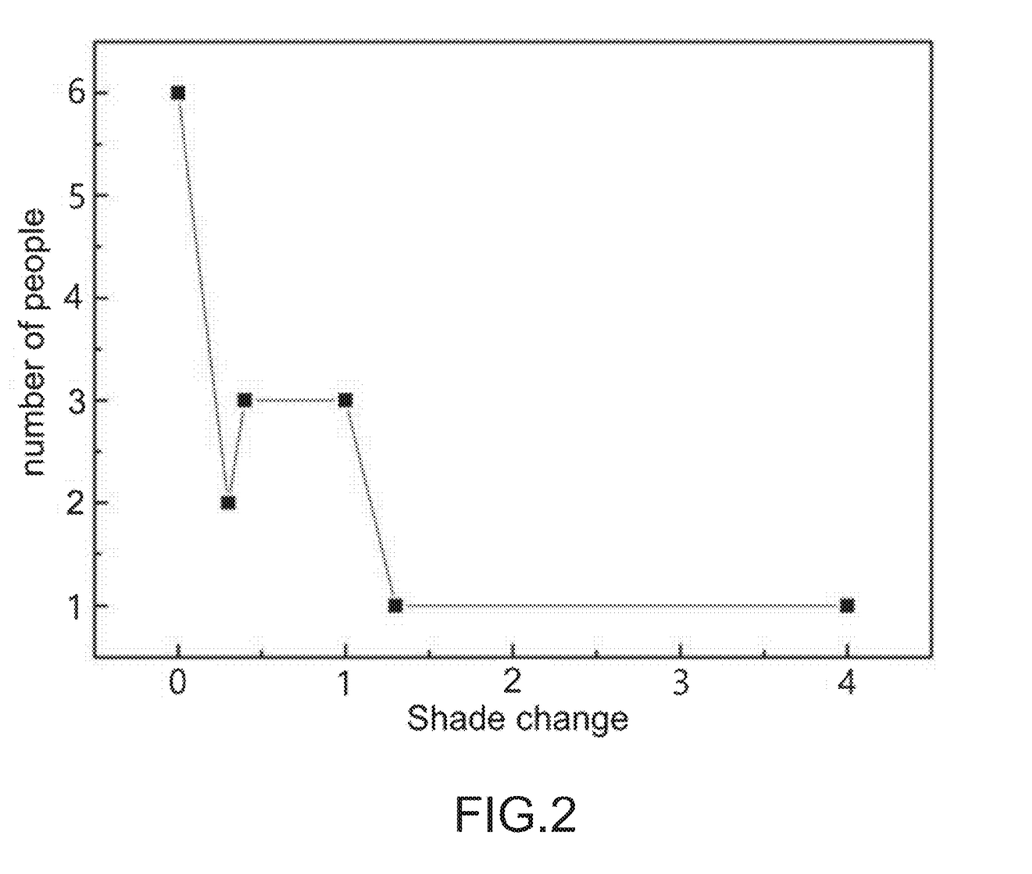
FIG. 2 shows the results of the blank group in the small group testing.

The results are shown in FIGS. 2 to 5. FIG. 2 shows the results of the small group testing in the control group containing 16 subjects. The average reduction of the tooth color scale is 0.63, the mode is 0, and there is no obvious brightening and whitening effect.

Figure 3:
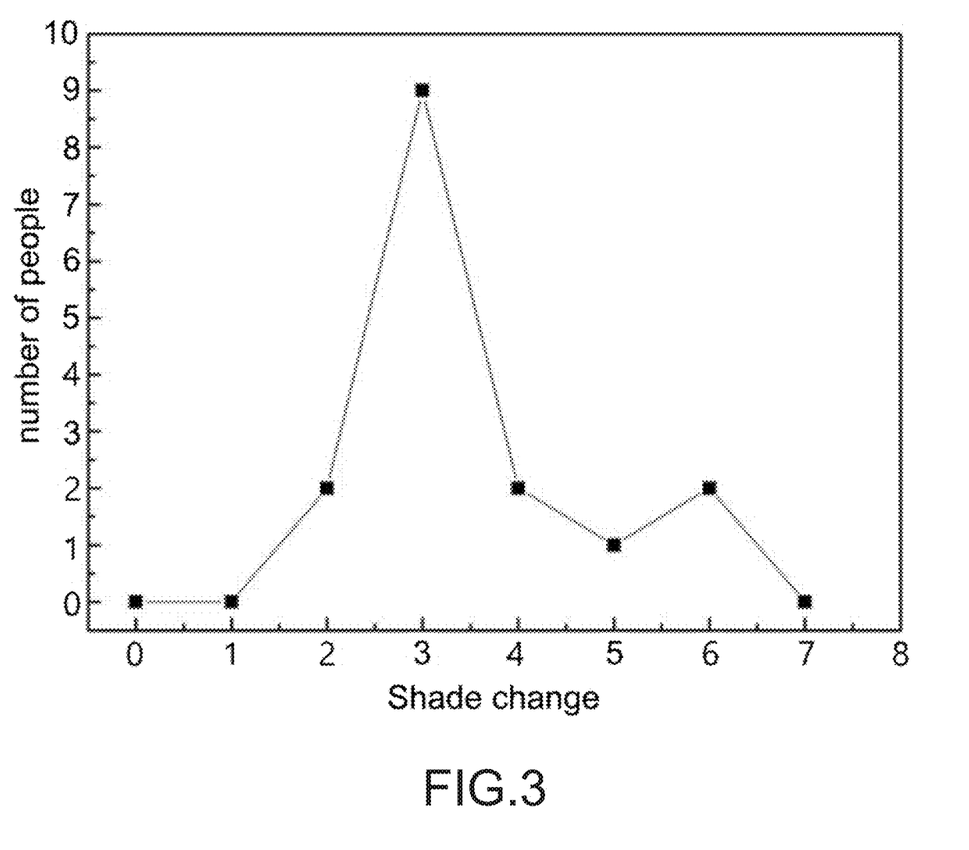
FIG. 3 shows the results of the small group testing of Formulation A.
Figure 4:
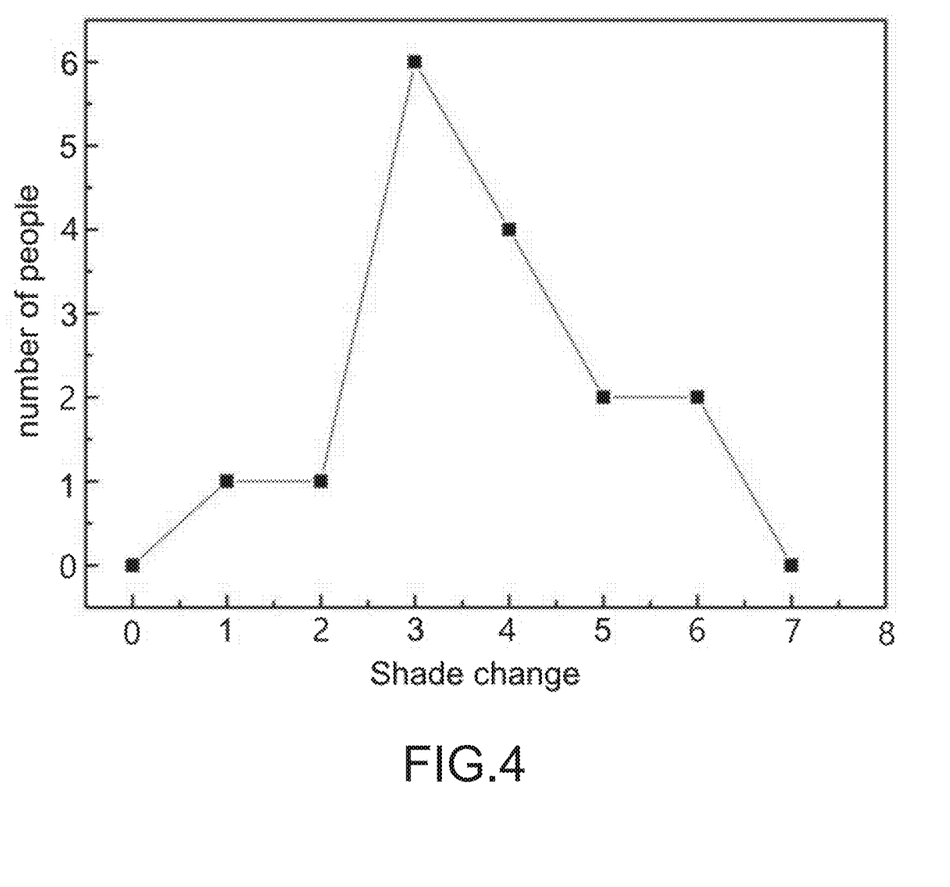
FIG. 4 shows the results of the small group testing of Formulation B.
Figure 5:
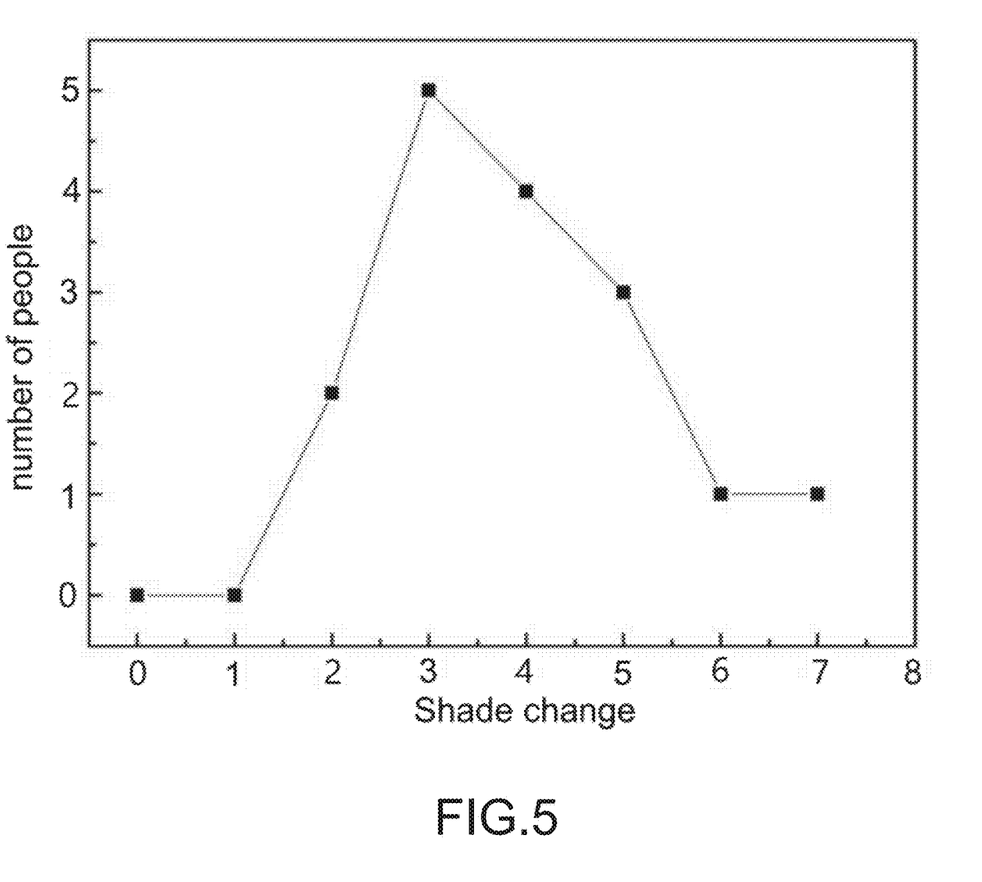
FIG. 5 shows the results of the small group testing of Formulation C.

FIG. 3 shows the results of the small group testing in the Formulation A group containing 16 subjects, wherein the average reduction of the tooth color scale is 3.56, the average satisfaction is 7.6/10, the mode is 3 color scales (9 subjects). FIG. 4 shows the results of the small group testing in the Formulation B group containing 16 subjects, wherein the average reduction of the tooth color scale is 3.77, the average satisfaction is 7.6/10, the mode is 3 color scales (6 subjects). FIG. 5 shows the results of the small group testing in the Formulation C group containing 16 subjects, wherein the average reduction of the tooth color scale is 3.88, the average satisfaction is 8/10, the mode is 3 color scales (5 subjects).

The above results show that all of Formulations A, B and C have the effect of tooth brightening and whitening, and the effect even reaches 3 color scales or above, and the overall average satisfaction is as high as 7.5 to 8 points. A detailed comparison of the three different formulations shows that increasing the addition ratio of film-forming agent and color-supplementing raw materials can improve the effect of tooth brightening and whitening, and also improve the satisfaction score.

After discussing the changes in the color scale values of the four different formulations in detail, it is known that, the control group did not have any effect, while Formulations A, B and C were based on the color scale with mode 3 as the reference point. After investigating the concentrations of film-forming agents and color-supplementing raw materials, Formulations B and C showed a significant increase in the number of subject who felt a high level of color scale change compared with Formulation A. This once again proves that increasing the concentrations of film-forming agents and color-supplementing raw materials helps to increase the color scale change rate of tooth brightening and whitening in a short time and at one time. Based on these results, Formulation A with a low concentration ratio of film-forming agents and color-supplementing raw materials and Formulation C with a high concentration ratio were selected for follow-up large group testing survey.

For the control group and Formulation C group, the t-test was used to analyze the correlation of the key ingredients and the brightening and whitening of the teeth. The calculated $p<0.05$ proves that there is a significant difference between the two formulas, and it also proves that adding polyurethane-35, CI 77891 and CI42090 1% to the formula can help for brightening and whitening teeth.

Example 2—Brightening and Whitening Long-Acting Test

In the small group testing, the brightening and whitening effect of Formulation C was the best, and thus Formulatin C was selected to further test the long-acting brightening and whitening effect. According to the similar steps of Examples 1.1 to 1.3, the changes in the effect of tooth brightening and whitening after applying the brightening spray containing Formulation C were observed for 3 hours.

Figure 6:
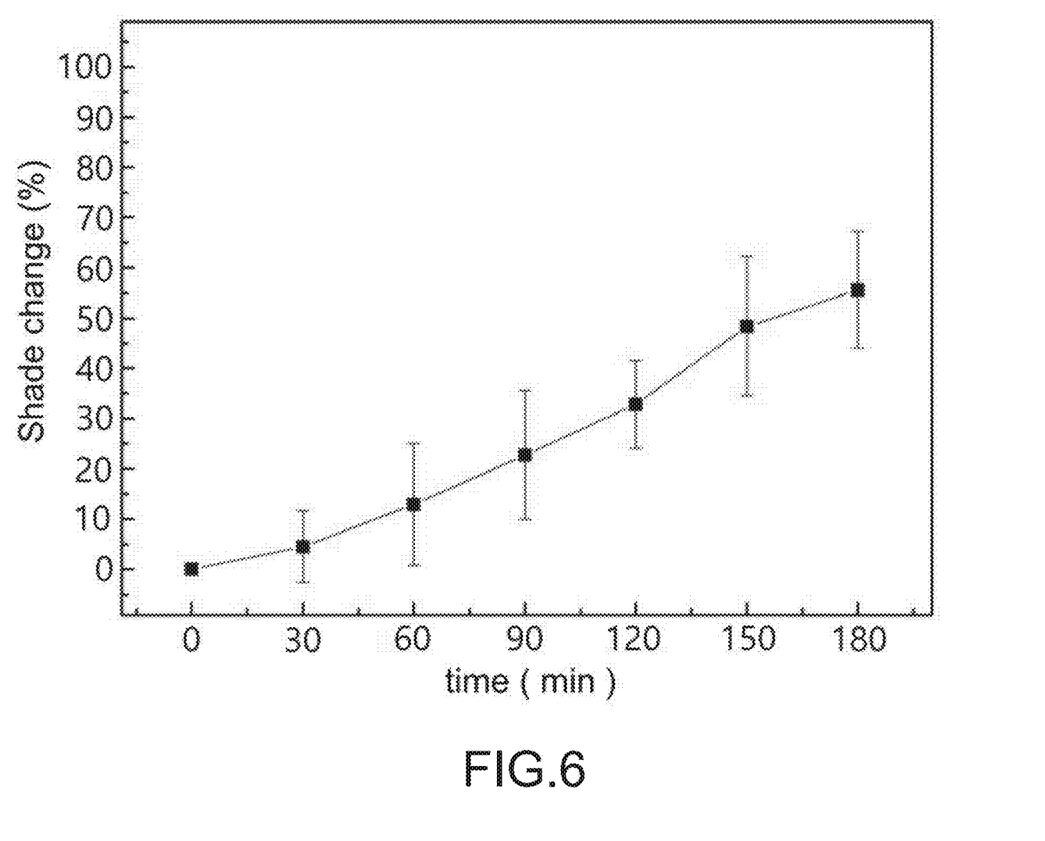
FIG. 6 shows the results of the long-acting testing of Formulation C.

FIG. 6 shows the results of the long-acting testing of Formulation C. 6 subjects participated in the test (N=6). From the results, it can be found that after using Formulation C, the teeth gradually regain their color scale over time. Within the test period of 3 hours (180 mins), the total color return rate of the teeth reached 55%. It can be considered that the brightening and whitening effect of the brightening spray containing Formulation C on the teeth can be maintained for more than 3 hours.

Example 3—Large Group Testing Survey

Large group testing survey was carried out according to the similar steps of Example 1, and 102 subjects participated in the test.

Figure 7:
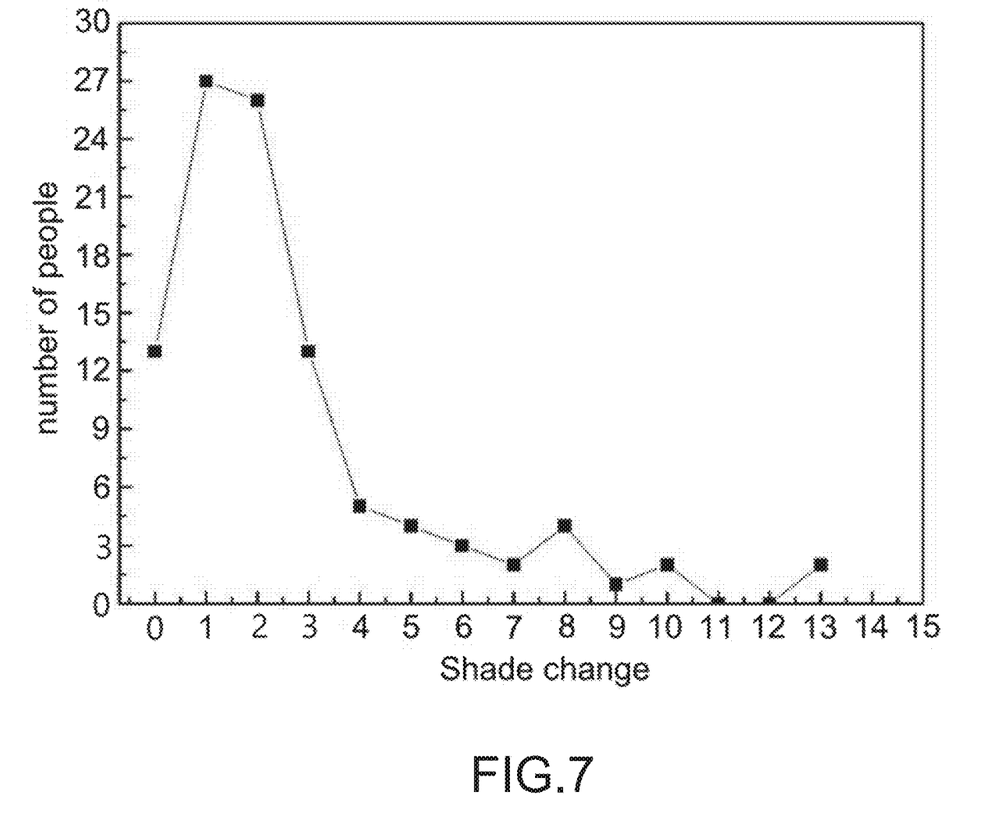
FIG. 7 shows the results of the large group testing of Formulation A.
Figure 8:
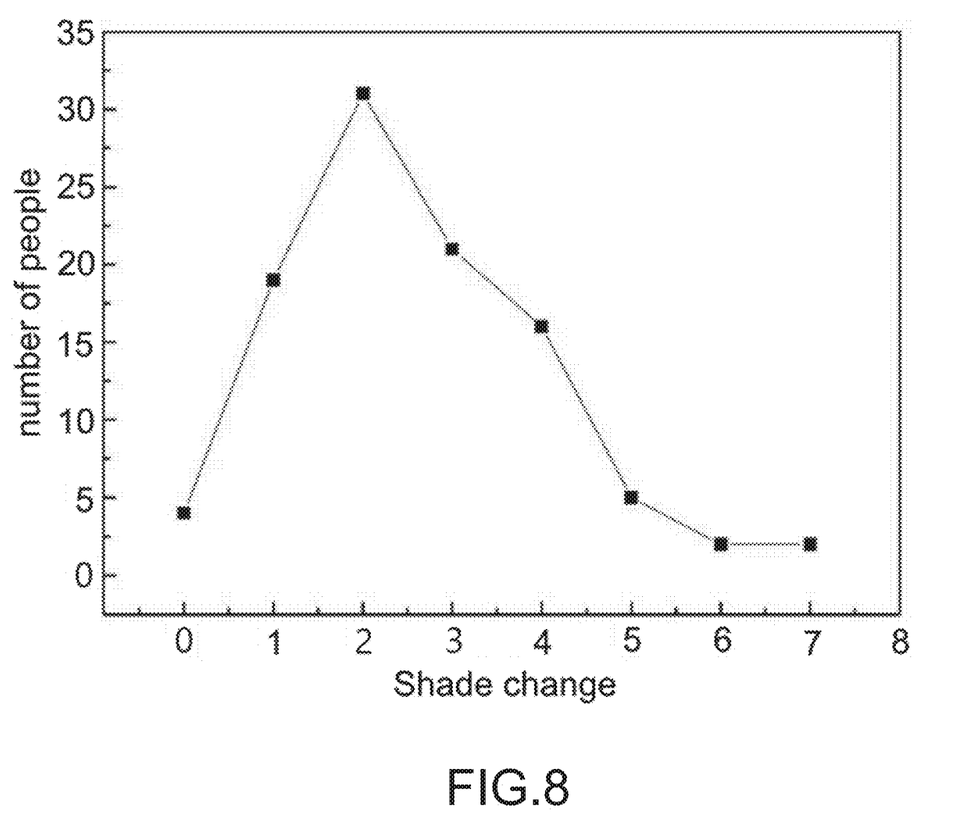
FIG. 8 shows the results of the large group testing of Formulation C.

The results are as shown in FIGS. 7 and 8. FIG. 7 shows the results of the large group testing in the Formulation A group containing 102 subjects, wherein the average reduction of the tooth color scale is 2.51, the average satisfaction is 5.9/10, the mode is 1 color scales (27 subjects). FIG. 8 shows the results of the large group testing in the Formulation C group containing 100 subjects, wherein the average reduction of the tooth color scale is 2.59, the average satisfaction is 7.1/10, the mode is 2 color scales (31 subjects).

Compared with the results of the small group testing survey, although the results of the large group testing survey have slightly decreased, there is still a significant difference compared with the control group of the small group testing survey. Therefore, the results of large group testing survey can once again prove that film-forming agents supplemented with color-supplementing raw materials can effectively produce the effect of brightening and whitening teeth with an average change of more than 2 color scales at one time after a short application time.

In the large group testing, the data range with a reduction of 0 to 5 color scales were selected for analyzing the correlation of Formulation A and Formulation C and the tooth brightening and whitening by using t-test. The calculated $p<0.05$ proves that there is a significant difference between Formulation A and Formulation C, and the concentrations of key raw materials will affect the brightening and whitening effect of teeth. It can be confirmed that the effect of brightening and whitening teeth and satisfaction score can be improved with the increase of the addition ratio of film-forming agent and color-supplementing raw materials.

Comparing the results of applying Formulations A and C, among the subjects with 0 change in color scale, there were 13 persons in Formulation A group and only 4 persons in Formulation C. Among the subjects with 1 change in color scale, there were 27 persons in Formulation A and 19 persons in Formulation C. For subjects with poor effect of brightening and whitening teeth, Formulation C can effectively improve the brightening and whitening effect on the teeth of the subject. Comparing the statistical chart again, it can be found that compared with the number of subjects in the color scale distribution of Formulation A, the color scale distribution of Formulation C is more concentrated, and the mode has an upward trend. This result indicates that the satisfaction score of Formulation C containing higher concentrations of active ingredients is higher than that of Formulation A containing lower concentration of active ingredients, and the subjects' feedback on the brightening and whitening effect of Formulation C was as high as 89%.

This result proves that as the addition ratio of film-forming agents and color-supplementing raw materials increases, the effect of brightening and whitening teeth can be improved, and the brightening spray of the present disclosure is more suitable for subjects whose teeth are difficult to whiten originally.

Example 4—Comparation of Other Food Colours

According to the above process, brightening formulation D containing polyurethane-35, white food colours, blue food colours and other components at the same concentrations in the form of spray, wherein CI 77891 ($TiO_2$), CI 77019 (Mica), CI 77220 ($CaCO_3$), and CI 77004 (kaolinite) were selected as white food colours, and CI 42090 (Blue #1), CI 73015 (Blue #2), and CI 77007 were selected as blue food colours for cross-combinations and comparisons. The content of ingredients used in each group is the same, as shown in Table 2 below.

TABLE 2

Components added ratios

| Components | Formulation D(%) |
| --- | --- |
| Polyurethane-35 | 15 |
| white colours | 2 |
| blue colours | 0.06 |
| Other components: | Adding to 100% |
| water, acrylates copolymer, acesulfame potassium, sorbitol, isomaltitol, potassium hydroxide, phenoxyethanol, ethylhexylglycerin, flavoring agent, CI 45430 1%, glycerol, Chlorphenesin, 1,2-hexanediol | |

Results

Table 3 shows the effect of matching four white food colours and three blue food colours on the reduction of the color scale of teeth, and wherein the control group does not contain white food colours and blue food colours.

TABLE 3

The effect of the combinations containing different colours on the reduction of the color scale of teeth (N = 4)

| Blue food colours | — | White food colours | | | |
| --- | --- | --- | --- | --- | --- |
| | | CI 77891 ($TiO_2$) | CI 77019 (Mica) | CI 77220 ($CaCO_3$) | CI77004 (kaolinite) |
| — | | 0.63 (control) | 1.25 | 1.55 | 1.25 | 1 |
| CI 42090 (Blue #1) | 1.75 | 3.56 | 3.25 | 2.25 | 2.625 |
| CI 73015 (Blue #2) | 1.25 | 2.325 | 2.1 | 2 | 1.8 |
| CI 77007 | 1.775 | 2 | 2.575 | 2 | 2.2 |

According to the experimental results, polyurethanes with white food colours (4 types) or blue food colours (3 types) can brighten and whiten teeth. When only a single colour was used, it showed limited reduction in color scales of tooth, up to a maximum of 1.775 color scales (CI77007). The combination of white and blue food colours can enhance the effect of brightening and whitening teeth, and the maximum color scales can be reduced by 3.56 (Group CI77891+CI42090).

Effects of the Brightening Formulation

Based on the results of the above examples, after the calculation of the t-test, there were significant differences between the control group and Formulation C in the small group testing and between Formulation A and Formulation C in the large group testing. The long-acting effect test carried out with Formulation C demonstrated that the brightening and whitening effect of the brightening spray can act for more than 3 hours. It can be proved that the tooth whitening composition of the present disclosure, which is mainly composed of the polyurethane and supplemented with the white and blue food colours, can effectively enhance the effect of brightening and whitening teeth for a long time within a one-time and very short application time, even less than one minute. According to the above examples based on the presence or absence and concentrations of the polyurethane and two color-supplementing raw materials of white and blue food colours, it can demonstrate that the proportions of these ingredients all contribute to the effect of brightening and whitening teeth, and it is more helpful to achieve said effect on teeth that are not easy to whiten. Therefore, according to the application time, the original tooth color, and the effect of brightening and whitening teeth to be achieved, each component in the brightening formulation of the present disclosure can be adjusted to the most suitable or optimal concentration ratio.

Enumerated Embodiments

The following exemplary embodiments are provided, the numbering of which is not to be construed as designating levels of importance.

Embodiment 1 provides a tooth brightening composition, which comprises 3% to 30% by weight of polyurethane, 0.1% to 10% of at least one white food colour and 0.01% to 5% of at least one blue food colour, and orally acceptable carriers and/or excipients, relative to the weight of the tooth brightening composition.

Embodiment 2 provides the tooth brightening composition of Embodiment 1, wherein the at least one white food colour is selected from the group consisting of Colour Index International (CI) 75170, CI 77002, CI 77004, CI 77019, CI 77120, CI 77163, CI 77220, CI 77231, CI 77713, CI 77891, and the combination thereof.

Embodiment 3 provides the tooth brightening composition of Embodiment 1, wherein the at least one white food colour is selected from the group consisting of CI 77891, CI 77019, CI 77220, CI77004, and the combination thereof.

Embodiment 4 provides the tooth brightening composition of Embodiment 1, wherein the at least one white food colour is CI 77891.

Embodiment 5 provides the tooth brightening composition of Embodiment 1, wherein the at least one blue food colour is selected from the group consisting of CI 42051, CI 42090, CI 69800, CI 69825, CI 73000, CI 73015, CI 74160, CI 77007, CI 77346, CI 77510, CI 20470, CI 42080, CI 61585, CI 62045, CI 74100, CI 74180, and the combination thereof. Embodiment 6 provides the tooth brightening composition of Embodiment 1, wherein the at least one blue food colour is selected from the group consisting of CI 42090, CI73015, CI77007, and the combination thereof.

Embodiment 7 provides the tooth brightening composition of Embodiment 1, wherein the at least one blue food colour is N-ethyl-N-[4-[[4-[ethyl[(3-sulfophenyl)methyl]amino]phenyl](2-sulfophenyl)methylene-2,5-cyclohexadien-1-ylidene]-3-sulfo-, innersalt, aluminumsalt (CI42090).

Embodiment 8 provides the tooth brightening composition of Embodiment 1, wherein the at least one blue food colours are water-soluble transparent blue food colours.

Embodiment 9 provides the tooth brightening composition of Embodiment 1, which further comprises CI45430.

Embodiment 10 provides the tooth brightening composition of Embodiment 1, which further comprises water.

Embodiment 11 provides the tooth brightening composition of Embodiment 1, which further comprises at least one humectant.

Embodiment 12 provides the tooth brightening composition of Embodiment 1, wherein the humectant is selected from the group consisting of sorbitol, glycerol, xylitol, propylene glycol, 1,2-hexanediol, and the combination thereof.

Embodiment 13 provides the tooth brightening composition of Embodiment 1, which further comprises at least one anti-calculus agent.

Embodiment 14 provides the tooth brightening composition of Embodiment 13, wherein the anti-calculus agent is selected from the group consisting of copolymers of polyacrylates, maleic anhydride and/or methyl vinyl ether and the mixture thereof.

Embodiment 15 provides the tooth brightening composition of Embodiment 1, which further comprises at least one surfactant.

Embodiment 16 provides the tooth brightening composition of Embodiment the surfactant is selected from the group consisting of polysorbate 20, polysorbate polysorbate 60, polysorbate 65, polysorbate 80 and the combination thereof.

Embodiment 17 provides the tooth brightening composition of Embodiment 1, which further comprises at least one sweetening agent.

Embodiment 18 provides the tooth brightening composition of Embodiment 17, the sweetening agent is selected from the group consisting of isomaltitol, maltose, xylitol, saccharin, sucralose, *stevia* extract, aspartame, and the combination thereof.

Embodiment 19 provides the tooth brightening composition of Embodiment 1, which further comprises at least one potassium salt as an anti-sensitizer.

Embodiment 20 provides the tooth brightening composition of Embodiment 19, wherein the potassium salt as an anti-sensitizer is selected from the group consisting of potassium citrate, potassium nitrate, potassium chloride, and the combination thereof.

Embodiment 21 provides the tooth brightening composition of Embodiment 1, which further comprises at least one pH regulator.

Embodiment 22 provides the tooth brightening composition of Embodiment 21, wherein the pH regulator is selected from the group consisting of sodium hydroxide, potassium hydroxide, triethanolamine, nitrotriethanol, citric acid, malic acid, lactic acid, sodium citrate, boric acid, borax, potassium hydrogen phosphate, and the combination thereof.

Embodiment 23 provides the tooth brightening composition of Embodiment 1, which further comprises at least one antibacterial or preservative.

Embodiment 24 provides the tooth brightening composition of Embodiment 23, wherein the antibacterial or preservative is selected from the group consisting of phenoxyethanol, benzoic acid, salicylic acid, p-hydroxybenzoic acid, methyl-p-hydroxybenzoate, Chlorphenesin, ethylhexylglycerin, and the combination thereof.

Embodiment 25 provides the tooth brightening composition of Embodiment 1, which further comprises at least one flavoring agent.

Embodiment 26 provides the tooth brightening composition of Embodiment wherein the flavoring agent comprises essential oils and various flavoring aldehydes, esters, alcohols, wherein examples of the essential oils include oil extracts from lemon, lime, grapefruit, orange, peppermint, wintergreen, *sassafras*, clove, sage, spearmint, marjoram, and/or cinnamon.

Embodiment 27 provides the tooth brightening composition of Embodiment wherein the flavoring agent comprises acesulfame potassium, ethyl menthane carboxamide, menthol, carvone, or anethole.

Embodiment 28 provides the tooth brightening composition of any one of Embodiments 1 to 27, wherein the dosage form of the tooth brightening composition is a solution, slurry, gel, paste, or ointment.

Embodiment 29 provides the tooth brightening composition of any one of Embodiments 1 to 27, wherein the dosage form of the tooth brightening composition is a spray or mouthwash.

Embodiment 30 provides a tooth brightening kit comprising the tooth brightening composition of any one of Embodiments 1 to 27 and instructions.

Embodiment 31 provides a method for brightening teeth, which comprises applying an effective amount of tooth brightening composition of any one of Embodiments 1 to 27 to the tooth surface for a period of time, and then gargling with water to remove the tooth brightening composition not unattached to the tooth surface.

What is claimed is:

1. A tooth brightening composition, which comprises 3% to 30% by weight of polyurethane, 0.1% to 10% of at least one white food colour and 0.01% to 5% of at least one blue food colour, relative to the weight of the tooth brightening composition, and orally acceptable carriers and/or excipients.

2. The tooth brightening composition of claim 1, wherein the at least one white food colour is selected from the group consisting of Colour Index International (CI) 75170, CI 77002, CI 77004, CI 77019, CI 77120, CI 77163, CI 77220, CI 77231, CI 77713, CI 77891, and the combination thereof.

3. The tooth brightening composition of claim 1, wherein the at least one white food colour is selected from the group consisting of CI 77891, CI 77019, CI 77220, CI 77004, and the combination thereof.

4. The tooth brightening composition of claim 1, wherein the at least one white food colour is CI 77891.

5. The tooth brightening composition of claim 1, wherein the at least one blue food colour is selected from the group consisting of CI 42051, CI 42090, CI 69800, CI 69825, CI 73000, CI 73015, CI 74160, CI 77007, CI 77346, CI 77510, CI 20470, CI 42080, CI 61585, CI 62045, CI 74100, CI 74180, and the combination thereof.

6. The tooth brightening composition of claim 1, wherein the at least one blue food colour is selected from the group consisting of CI 42090, CI 73015, CI 77007, and the combination thereof.

7. The tooth brightening composition of claim 1, wherein the at least one blue food colour is CI 42090.

8. The tooth brightening composition of claim 1, which further comprises CI 45430.

9. The tooth brightening composition of claim 1, which further comprises one or more additives selected from the group consisting of humectant, anti-calculus agent, surfactant, anti-sensitizer, pH regulator, antibacterial, preservative, sweetening agent, and flavoring agent.

10. The tooth brightening composition of claim 9, wherein the humectant is selected from the group consisting of water, sorbitol, glycerol, xylitol, propylene glycol, hexanediol, and the combination thereof.

11. The tooth brightening composition of claim 9, wherein the anti-calculus agent is selected from the group consisting of copolymers of polyacrylates, maleic anhydride and/or methyl vinyl ether and the mixture thereof.

12. The tooth brightening composition of claim 9, wherein the surfactant is selected from the group consisting of polysorbate 20, polysorbate 40, polysorbate 60, polysorbate 65, polysorbate 80, and the combination thereof.

13. The tooth brightening composition of claim 9, wherein the sweetening agent is selected from the group consisting of isomaltitol, maltose, xylitol, saccharin, sucralose, *stevia* extract, aspartame, and the combination thereof.

14. The tooth brightening composition of claim 9, wherein the anti-sensitizer is selected from the group consisting of potassium citrate, potassium nitrate, potassium chloride, and the combination thereof.

15. The tooth brightening composition of claim 9, wherein the pH regulator is selected from the group consisting of sodium hydroxide, potassium hydroxide, triethanolamine, nitrotriethanol, citric acid, malic acid, lactic acid, Sodium citrate, boric acid, borax, Potassium hydrogen phosphate, and the combination thereof.

16. The tooth brightening composition of claim 9, wherein the antibacterial or preservative is selected from the group consisting of phenoxyethanol, benzoic acid, salicylic acid, p-hydroxybenzoic acid, methyl-p-hydroxybenzoate, Chlorphenesin, ethylhexylglycerin, and the combination thereof.

17. The tooth brightening composition of claim 9, wherein the flavoring agent is selected from the group consisting of lemon oil, lime oil, grapefruit oil, orange oil, peppermint oil, wintergreen oil, *sassafras* oil, clove oil, sage oil, spearmint oil, marjoram oil, cinnamon oil, acesulfame potassium, ethyl menthane carboxamide, menthol, carvone, anethole, and the combination thereof.

18. The tooth brightening composition of claim 1, which is in the dosage form of solution, slurry, gel, paste, ointment, spray, or mouthwash.

19. A tooth brightening kit comprising the tooth brightening composition of claim 1 and instructions.

20. A method for brightening teeth, which comprises applying an effective amount of tooth brightening composition of claim 1 to the tooth surface for a period of time, and then gargling with water to remove the tooth brightening composition not unattached to the tooth surface.

* * * * *